United States Patent [19]

Kim

[11] Patent Number: 5,736,889

[45] Date of Patent: Apr. 7, 1998

[54] DUPLEXING CONTROL APPARATUS FOR USE IN A TIME DIVISION SWITCHING DEVICE

[75] Inventor: Jae-Peoung Kim, Incheon, Rep. of Korea

[73] Assignee: Daewoo Telecom, Ltd., Incheon, Rep. of Korea

[21] Appl. No.: 658,921

[22] Filed: May 31, 1996

[30] Foreign Application Priority Data

May 31, 1995 [KR] Rep. of Korea ............ 95-14430

[51] Int. Cl.$^6$ ............................. H04Q 9/00; H04J 9/00
[52] U.S. Cl. ......................... 327/415; 327/403; 327/365; 327/99
[58] Field of Search .................. 327/403, 407, 327/415, 365, 99, 23; 340/825.01

[56] References Cited

U.S. PATENT DOCUMENTS 4,307,378  12/1981  Clark ...................... 327/415

Primary Examiner—Timothy P. Callahan
Assistant Examiner—Dinh T. Le
Attorney, Agent, or Firm—Pennie & Edmonds LLP

[57] ABSTRACT

An apparatus controls the operation mode of a time division switching device selected from two incorporated in an electronic switching system for reliability thereof. Mode information representing previous operation modes of the two time switching devices is received and processed to issue a first and a second mode control signals. Thereafter, status of each component in the selected switching device and a power from a power supply in the unselected switching device are analyzed to produce each component status information and power status information. Next, an initial duplexing control signal is obtained based on each component status information, the first and the second mode control signals, and the power status information. Finally, a duplexing control signal is derived based on each component status information, the mode information, the power status information, the initial duplexing control signal, and each component status information from the unselected switching device, to provide the generated duplexing control signal to the selected switching device, thereby controlling the operation mode thereof to operate in an active or inactive mode.

6 Claims, 2 Drawing Sheets

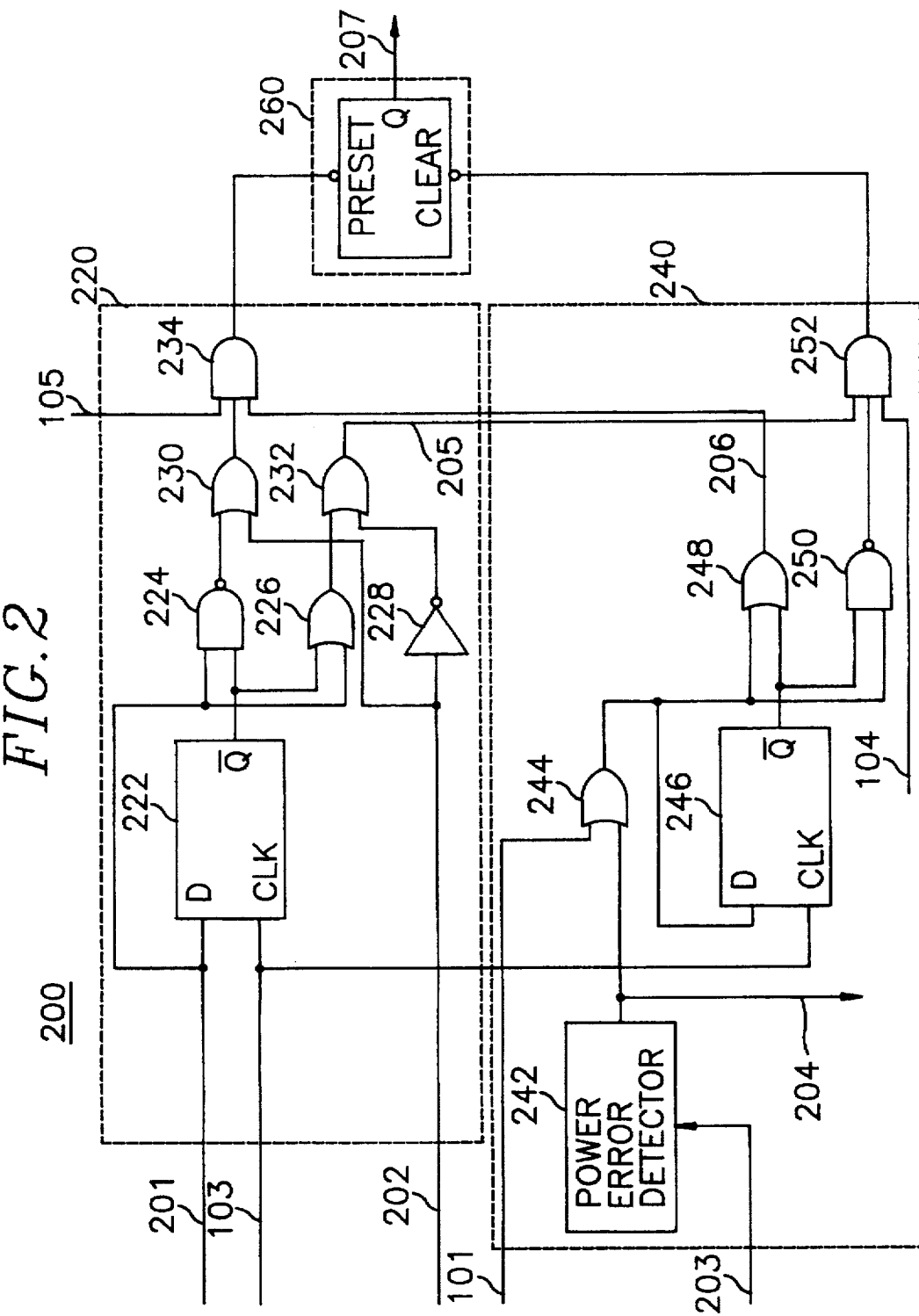

DUPLEXING CONTROL APPARATUS FOR USE IN A TIME DIVISION SWITCHING DEVICE

FIELD OF THE INVENTION

The present invention relates to a duplexing control apparatus for use in a time division switching device; and, more particularly, to an improved apparatus which is capable of effectively controlling the operation mode of a time division switching device incorporated in an electronic switching system.

BACKGROUND OF THE INVENTION

As is well known, an electronic switching system (ESS) serves to select and connect two assigned subscribers among a great number of subscribers so as to communicate information therebetween.

The ESS basically includes a multiplicity of access switching subsystems (ASS's), an interconnection network subsystem (INS) and a central control subsystem (CCS). Each ASS includes a subscriber interfacing unit and a time division switching device to communicate information between two subscribers, i.e., a sending subscriber and a receiving subscriber, selected from a plurality of subscribers. When the two selected subscribers are coupled to an ASS, they are connected within the same ASS. On the other hand, When the two selected subscribers are coupled to two different ASS's, then they are interfaced to the INS and connected within the INS. The INS, coupled with each of the ASS's and the CCS, includes a central data link module and a space division switching unit and connects the two selected subscribers. Finally, the CCS coupled with the ASS's and the INS serves to perform a series of operation and maintenance processes of the ESS.

However, in order to effectively communicate information between the two connected subscribers, there are generally incorporated two time division switching devices within each ASS instead of one. When an active time division switching device is malfunctioning, the operation mode of the malfunctioning device is set to be inactive or stand-by and the operation mode of the other is set to be active, thereby enabling continuous communication of information between the two connected subscribers.

Each time division switching device includes components such as a power supply and a time slot interchanging assembly (TSIA) for actually connecting two assigned subscribers. It further includes a common control memory & maintenance board assembly (CMMA) for controlling the operation of the TSIA and executing a maintenance for a multiplicity of components contained therein, and a duplexing control apparatus for controlling the operation mode thereof, setting it either an active or an inactive mode.

As is well known in the art, an operation mode of each time division switching device within the ASS, e.g., the operation mode of a first time division switching device, is controlled based on the status of components contained in both time division switching devices and the status of power from the power supply of the counterpart switching device thereof, e.g., the power status from the power supply of a second time division switching device.

However, for a power failure in an active time division switching device, it takes time for the conventional duplexing control apparatus of the other inactive time division switching device to recognize the abnormality of the power status as a power failure thereof because the input power is regarded as normal until the level thereof becomes very low. This may result in a loss of a system clock signal provided from a network synchronizer within the INS through one of the two time division switching devices until the operation mode of the inactive time division switching device is set to be active; and, therefore, communication between the two selected subscribers may be disconnected.

Further, there may appear instances when both of the two time division switching devices within an ASS of the ESS are operated in an active mode or an inactive mode at the same time due to errors while their operation modes change.

SUMMARY OF THE INVENTION

It is, therefore, a primary object of the present invention to provide an improved apparatus which is capable of effectively controlling the operation mode of a time division switching device incorporated in an ESS, to thereby improve the performance of the ESS.

In accordance with the invention, there is provided an apparatus for controlling the operation mode of a subject time division switching device selected from two time division switching devices incorporated within an electronic switching system (ESS), said each time division switching device including first and second units to select and connect two assigned subscribers, which comprises:

first signal generation means for receiving mode information representing previous operation modes of the two time division switching devices to generate a first and a second mode control signals by employing the mode information;

unit status analyzing means for analyzing status of each of the first and the second units within the subject time division switching device selected and power from a power supply included in the first unit of the remaining time division switching device to produce corresponding unit status information and power status information;

second signal generation means for generating an initial duplexing control signal by using the unit status information, the first and the second mode control signals, the power status information, and first unit status information from the second unit contained in the remaining time division switching device representing the status of the first unit thereof; and third signal generation means for generating a duplexing control signal by utilizing the first unit status information, the mode information, the power status information, the initial duplexing control signal, and second unit status information from the remaining time division switching device representing the status of the second unit, to provide the generated duplexing control signal to the subject time division switching device, thereby controlling the operation mode thereof.

BRIEF DESCRIPTION OF THE DRAWING

The above and other objects and features of the present invention will become apparent from the following description of preferred embodiments with reference to the accompanying drawings) in which:

FIG. 2 presents a detailed block diagram of the first duplexing status analyzer shown in FIG. 1.

DETAILED DESCRIPTION OF THE PREFERRED EMBODIMENTS

Figure 1:
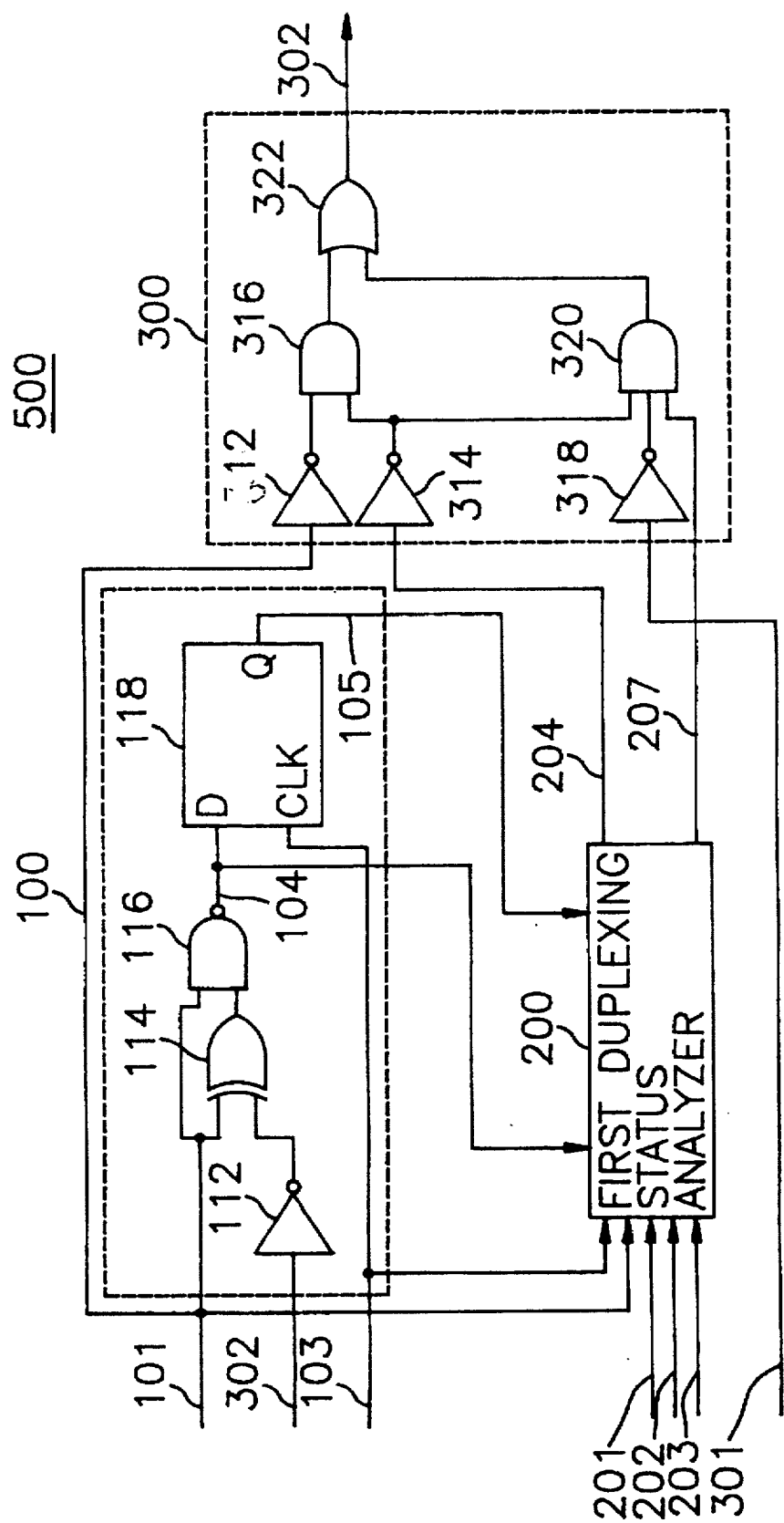
FIG. 1 is a block diagram illustrating a duplexing control apparatus for use in a time division switching device in accordance with the present invention.

Referring to FIG. 1, there is provided a block diagram of a duplexing control apparatus 500 of the present invention for use in a time division switching device incorporated within each ASS of an ESS (not shown). As is well known, there are generally two time division switching devices (not shown) within each ASS of the ESS for high performance thereof, each time division switching device including a plurality of components, e.g., a power supply, a TSIA and a CMMA.

For the sake of simplicity, following description of the present invention will be provided with respect to a duplexing control apparatus 500 illustrated in FIG. 1, included in one of the two time division switching devices, e.g., a first time division switching device. The inventive duplexing control apparatus 500 comprises a mode controller 100 and two duplexing status analyzers, a first one 200 and a second one 300.

As shown in FIG. 1, a first feedback duplexing control signal FDCS1 from the second duplexing status analyzer 300 of the first time division switching device is applied to the mode controller 100 via a line 302, while a second feedback duplexing control signal FDCS2 from a duplexing control apparatus (not shown) of a second time division switching device within the ASS is inputted via a line 161 to the mode controller 100, and the first and the second duplexing status analyzers 200 and 300. Each of the first and the second feedback duplexing control signals FDCS1 and FDCS2 represents a previously generated duplexing control signal from the corresponding duplexing control apparatus.

For instance, if a previous operation mode of a time division switching device is inactive, the feedback duplexing control signal, FDCS1 or FDCS2, is logic high and if otherwise, it is logic low. And, a system clock (CLK) signal from a Network Synchronizer(NES) (not shown) incorporated in an INS of the ESS is coupled, via a line 103, to the mode controller 100 and the first duplexing status analyzer 200.

The mode controller 100 includes an inverter 112, an EXOR (exclusive-OR) gate 114, a NAND gate 116 and a D flip/flop (F/F) 118 and serves to derive a first and a second mode control signals, MCS1 and MCS2, to be used in preventing both the first and the second time division switching devices from operating in a same inactive mode or a same active mode at the same time.

Specifically, the inverter 112 inverts the signal FDCS1 supplied and provides an inverted feedback duplexing control signal to the EX-OR gate 114. And then, the EX-OR gate 114, operating on the inverted feedback duplexing control signal from the inverter 112 and the second feedback duplexing control signal FDCS2 from the second time division switching device via the line 101, outputs a logic high if logic levels of the inputs thereto are different from each other; and a logic low if otherwise, wherein the output from the EX-OR gate 114 is then provided to the NAND gate 116.

The NAND gate 116, operating on the exclusive OR operated data from the EX-OR gate 114 and the second feedback duplexing control signal FDCS2 supplied from the second time division switching device via the line 101, outputs a logic low if all the inputs thereto are logic high; and a logic high if otherwise. The NAND operated data is then provided via a line 104 to the first duplexing status analyzer 200 as the first mode control signal MCS1 and to the D F/F 118 as its D input.

As is well known, the D F/F 118 serves to latch the NAND operated data from the NAND gate 116 supplied through the line 104 for a predetermined interval in response to the CLK signal from the NES via the line 103. The output Q, i.e., the latched data, from the D F/F 118 is provided, as the second mode control signal MCS2, to the first duplexing status analyzer 200 via a line 105.

As may be seen from the above, when both of the two feedback duplexing control signals FDCS1 and FDCS2 on the line 302 and 101 are logic high, i.e., both the first and the second time division switching devices are inactive, the first mode control signal MCS1 outputted through the line 104 will be a logic low. The MCS1 is then provided to the first duplexing status analyzer 200, wherein an initial duplexing control signal IDCS is generated to set the first time division switching device to an active mode.

On the other hand, when both of the two feedback duplexing control signals FDCS1 and FDCS2 are logic low, i.e., both of the two time division switching devices are active, the CLK signal is designed so that the second mode control signal MCS2 on the line 105 becomes a logic low. The MCS2 is supplied to the first duplexing status analyzer 200 which generates the initial duplexing control signal IDCS to set the first time division switching device to an inactive mode.

In the meantime, two component status signals, CSS1 and CSS2, representing the status of the two components included in each of the firsthand the second time division switching devices, e.g., a power supply and a TSIA, are provided from a CMMA contained therein to the first duplexing status analyzer 200 through lines, 201 and 202, respectively. Power from a power supply of the second time division switching device is also fed to the first duplexing status analyzer 200 via a line 203.

At the first duplexing status analyzer 200, the initial duplexing control signal IDCS is derived by using a novel duplexing status analyzing scheme of the present invention to use in controlling the operation mode of the first time division switching device.

Referring now to FIG. 2, there is depicted a detailed block diagram of the first duplexing status analyzer 200 in accordance with the present invention shown in FIG. 1. The first duplexing status analyzer 200 includes a first and a second enable signal generators 220 and 240, and an initial duplexing control signal generator 260.

As shown in FIG. 2, the first enable signal generator 220 includes a D F/F 222, a NAND gate 224, three OR gates 226, 230 and 232, an inverter 228 and an AND gate 234, and produces a first enable signal ES1 to provide the same to the duplexing status signal generator 260. Specifically, inputs to the D F/F 222 are the first component status signal CSS1 from the CMMA of the first time division switching device via the line 201 and the CLK signal from the NES through the line 103. The D F/F 222 is substantially identical to the D F/F 118 as described above except that an output of the D F/F 222 is provided from an inverting output Q̄ thereof. Therefore, the D F/F 222 outputs latched data Q̄ from the first component status signal CSS1 in response to the CLK signal and relays it to the NAND gate 224 and the first OR gate 226.

The NAND gate 224, receiving the first component status signal CSS1 via the line 201 and the latched data Q̄ from the D F/F 222 and operating similarly to the NAND gate 116, outputs a logic low if all the inputs thereto are logic high and a logic high if otherwise. The NAND operated data from the NAND gate 224 is then supplied to the second OR gate 230.

The second OR gate 230, which receives the NAND operated data from the NAND gate 224 and the second component status signal CSS2 from the second time division switching device via the line 202, generates a logic low if all the inputs thereto are logic low, and a logic high, if otherwise. The OR operated data is then fed to the AND gate 234.

On the other hand, the first OR gate 226, with the first component status signal CSS1 via the line 201 and the latched data $\overline{Q}$ from the D F/F 222 inputted thereto, outputs a logic low if all the inputs thereto are logic low and a logic high if otherwise. The OR operated data is then applied to the third OR gate 232.

As shown, the second component status signal CSS2 on the line 202 is applied to the inverter 228 which inverts the input data thereto and provides inverted data to the third OR gate 232. The third OR gate 232, operating on the OR operated data from the first OR gate 226 and the inverted component status information from the inverter 228, supplies the OR operated data to the second enable signal generator 240 via a line 205 as a first reference signal RS1.

As can be seen from the above, the output from the third OR gate 232 is a logic low if both the OR operated data from the second OR gate 226 and the inverted information from the inverter 228 are logic low, i.e., all the components of the first time division switching device are connected therein and any of the components of the second time division switching device is detached therefrom; and a logic high if otherwise.

Finally, the AND gate 234, operating on the OR operated data from the second OR gate 230, the second mode control signal MCS2 on the line 105 and a second reference signal RS2 from the second enable signal generator 240 inputted thereto, outputs a logic low if any of the inputs thereto is in a logic low level; and a logic high if otherwise. Thereafter, the output from the AND gate 234 is provided, as the first enable signal ES1, to the initial duplexing control signal generator 260. The second reference signal RS2 can be derived by using the second feedback duplexing control signal FDCS2 from the second time division switching device provided via the line 101 and power status of the power supply thereof on the line 203. Detailed description for the second reference signal RS2 will be given with reference to the second enable signal generator 240 hereinafter.

As can be seen from the above, the first enable signal generator 220 generates a first logic low enable signal ES1; firstly, if the signal CSS1 from the line 201 is logic high and the signal CSS2 from the line 202 is logic low, respectively, i.e., at least anyone of the components of the first time division switching device is detached therefrom and all the components of the second time division switching device are connected therein; secondly, if the second reference signal RS2 from the second enable signal generator 240 is a logic low, i.e, the power from the power supply of the second time division switching device is normal and the previous operation mode thereof is active; and finally, if the second mode control signal MCS2 via the line 105 from the D F/F 118 of the mode controller 100 shown in FIG. 1 is a logic low, i.e. the previous operation modes of the first and the second time division switching device are all active.

In the meantime, the second enable signal generator 240, which includes a power error detector 242, two OR gates 244 and 248, a D F/F 246, a NAND gate 250 and an AND gate 252, generates the second reference signal RS2 and a second enable signal ES2 to provide each of them to the AND gate 234 of the first enable signal generator 220 via the line 206 and to the initial duplexing control signal generator 260, respectively.

More specifically, the power error detector 242, with power being supplied from the power supply of the second time division switching device on the line 203, detects any errors in the power by comparing it with a predetermined threshold value TH1, wherein the power is considered to be normal if it is equal to or larger than TH1, TH1 being a positive integer; and erroneous if otherwise, and a power error signal PES is generated. In a preferred embodiment of the present invention, the predetermined threshold value TH1 is determined to be equal to a minimum power capable of stably operating each component within the second time division switching device so that an early detection of the power failure can be achieved. The power error signal PES is then fed to the first OR gate 244 and to the second duplexing status analyzer 300 via a line 204, wherein the power error signal PES is a logic high if the power is regarded as erroneous.

As shown in FIG. 2, inputs to the first OR gate 244 are the power error signal PES from the power error detector 242 and the second feedback duplexing control signal FDCS2 from the second time division switching device via the line 101. The first OR gate 244 performs a same OR operation as mentioned above for the inputs thereto. In a preferred embodiment of the present invention, if the power error signal PES supplied to the first OR gate 244 is logic high, i.e., the power is erroneous, an output therefrom is a logic high regardless of the second feedback duplexing control signal FDCS2; and, otherwise, the output from the first OR gate 244 depends on a logic level of the second feedback duplexing control signal FDCS2. The OR operated data from the first OR gate 244 is relayed to the D F/F 246, the second OR gate 248 and the NAND gate 250.

The D F/F 246 is substantially identical to the D F/F 222 as explained above except that a D input thereof is the OR operated data from the first OR gate 244. Therefore, the D F/F 246, in response to the CLK signal on the line 103, outputs latched data $\overline{Q}$ from the OR operated data and then provides the same to the second OR gate 248 and the NAND gate 250.

Inputs to the second OR gate 248 are the latched data $\overline{Q}$ from the D F/F 246 and the output from the first OR gate 244, wherein the second OR gate 248, performing similarly to the first OR gate 244, produces a logic low if the OR operated data from the first OR gate 244 is a logic low, i.e., the previous operation mode of the second time division switching device is active and the power therefrom is normal. In this case, the latched data $\overline{Q}$ from the D F/F 246 is a logic low. Thereafter, the OR operated data is provided, as the second reference signal RS2, to the AND gate 234 of the first enable signal generator 220.

On the other hand, the NAND gate 250, operating on the latched data $\overline{Q}$ from the D F/F 246 and the output from the first OR gate 244 inputted thereto, produces a logic low if all the inputs thereto are logic high, i.e., either the previous operation mode of the second time division switching device is inactive or the power is erroneous; and a logic high if otherwise, wherein the latched data $\overline{Q}$ from the D F/F 246 is a logic high. The NAND operated data from the NAND gate 250 is then fed to the AND gate 252.

Finally, inputs to the AND gate 252 are the NAND operated data from the NAND gate 250, the first reference signal RS1 from the third OR gate 232 of the first enable signal generator 220 via the line 205, and the NAND operated data from the NAND gate 104 of the mode controller 100 via the line 104. The AND gate 252 outputs a logic low if at least anyone of the inputs thereto is logic low, and a logic high if otherwise, wherein the output therefrom is then provided to the initial duplexing control signal generator 260 as the second enable signal ES2.

As can be seen from the above, the second enable signal generator 240 generates a second logic low enable signal ES2; firstly, if either the second feedback duplexing control signal FDCS2 on the line 101 is a logic high or the input power on the line 203 is smaller than TH1, i.e., either the previous operation mode of the second time division switching device is inactive or the power is erroneous; secondly, if the first reference signal RS1 from the third OR gate 232 of the first enable signal generator 220 via the line 205 is logic low, i.e., all the components of the first time division switching device are connected therein and at least anyone of the components of the second time division switching device is detached therefrom; thirdly, if the first mode control signal MCS1 from the NAND gate 116 of the mode controller 100 through the line 104 is logic low, i.e., the previous operation modes of the first and the second time division switching devices are all inactive.

Thereafter, the initial duplexing control signal generator 260 generates the initial duplexing control signal IDCS in response to either the first enable signal ES1 from the AND gate 234 of the first enable signal generator 220 or the second enable signal ES2 from the AND gate 252 of the second enable signal generator 240. Specifically, an output, i.e., the initial duplexing control signal IDCS, from the initial duplexing control signal generator 260, is a logic high if the first enable signal ES1 is a logic low; and a logic low if the second enable signal ES2 is a logic low. The initial duplexing control signal generator 260 may easily be implemented by using a F/F with asynchronous inputs, e.g., PRESET and CLEAR, well known in the art. Subsequently, the signal IDCS is provided to the second duplexing status analyzer 300 via a line 207 as shown in FIG. 1.

Referring back to FIG. 1, the second duplexing status analyzer 300 includes three inverters 312, 314 and 318, two AND gates 316 and 320, and an OR gate 322, and serves to effectively control the operation mode of the first time division switching device.

More specifically, each of the three inverters 312, 314 and 318 inverts each of the second feedback duplexing control signal FDCS2 from the second time division switching device via the line 101, the power error signal PES from the power error detector 242 of the second enable signal generator 240 provided via the line 204 and a component status signal from the second time division switching device via a line 301 for a CMMA thereof, respectively. The component status signal CMMASS for the CMMA is a logic high if the CMMA is detached from the second time division switching device; and a logic low if otherwise.

It should be noted that the second feedback duplexing control signal FDCS2 and the power error signal PES, which has already been used to derive the initial duplexing control signal IDCS, are further utilized to generate the duplexing control signal DCS to control quickly and precisely the operation mode of the first time division switching device. The inverted information from each of the inverters 312 and 318 is relayed to each of the AND gates 316 and 320, respectively, while the inverted information from the inverter 314 is relayed to both of the AND gates 316 and 320.

The first AND gate 316, with the information supplied from the inverters 312 and 314, outputs a logic low if at least anyone of the information from the inverters 312 and 314 is logic low, i.e., either the previous operation mode of the second time division switching device is inactive or the power is erroneous, wherein the AND operated data is then provided to the OR gate 322.

On the other hand, the second AND gate 320, operating on the inverted information from the second inverter 314, the initial duplexing control signal IDCS from the initial duplexing control signal generator 260 via the line 207, and the inverted information from the third inverter 318, outputs a logic low if any of the inputs thereto is logic low, i.e., the power is erroneous, or the CMMA of the second time division switching device is detached therefrom, or the initial duplexing control signal IDCS is logic low. The AND operated information from the first and the second AND gates 316 and 320 is then simultaneously supplied to the OR gate 322.

Finally, the OR gate 322, operating on the data supplied from the first and the second AND gates 316 and 320, outputs the duplexing control signal DCS to control the operation mode of the first time division switching device, wherein the signal DCS is a logic low if all the inputs thereto are logic low, and a logic high if otherwise.

As can be seen from the above, an output from the OR gate 322 is a logic low if neither the power from the second time division switching device is normal nor the previous operation mode thereof is active; and if neither the power is normal and the CMMA is connected within the second time division switching device, nor the initial duplexing control signal IDCS is in a logic high level. The OR operated duplexing control signal DCS of logic low or logic high from the OR gate 322 is provided via a line 302 to each of the corresponding components included in the first time division switching device so that it can be operated in its corresponding mode which is either an active or an inactive mode.

While the present invention has been shown and described with respect to the particular embodiments, it will be apparent to those skilled in the art that many changes and modifications may be made without departing from the spirit and scope of the invention as defined in the appended claims.

What is claimed is:

1. A duplexing control apparatus for controlling an operation mode of a time division switching device selected from dual time division switching devices incorporated within an electronic switching system (ESS) for reliability thereof, wherein the selected time division switching device includes a first module having a power supply and a time slot interchanging assembly (TSIA) to select and connect two assigned subscribers, which comprises:

a mode controller for receiving mode information representing whether previous operation modes of the dual time division switching devices are active or not, respectively, and generating, based on the received mode information, a first and a second mode control signals to prevent the dual time division switching devices from operating in a same inactive mode or a same active mode at the same time, wherein the first mode control signal is a first logic signal to set the operation mode of the selected time division switching device to be active when the previous operation modes of the dual time division switching devices are inactive simultaneously; and wherein the second mode control signal is a second logic signal to set the operation mode of the selected time division switching device to be inactive when the previous operation modes are active simultaneously;

a first duplexing status analyzer for analyzing operation status of the first module within the selected time division switching device and status of a power from a power supply included in a second module of the unselected time division switching device, to produce first and second module status information and power status information representing the analyzed result, and for generating an initial duplexing control signal based on the first and second module status information, the first and the second mode control signals, and the power status information; and a second duplexing status analyzer for generating a duplexing control signal based on the first module status information, the mode information, the power status information, the initial duplexing control signal, and the second module status information from the unselected time division switching device representing the status of the second module, to provide the generated duplexing control signal to the selected time division switching device, thereby controlling the operation mode thereof to operate in an active or inactive mode.

2. The apparatus in accordance with claim 1, wherein the power status information is derived by comparing a level of the power with a predetermined threshold value TH1, wherein the power status information is a first logic signal representing that the power is erroneous when the level of the power is smaller than TH1; and a second logic signal representing that the power is normal when the level is equal to or greater than TH1, TH1 being a positive integer.

3. The apparatus in accordance with claim 1, wherein said mode controller includes a NAND gate, an inverter and an EX-OR gate coupled to an input thereof, and a D Flip-flop connected to the output of the NAND gate, wherein the first mode control signal is derived from the output of the NAND gate and the second mode control signal is provided from the output of the D Flip-flop.

4. A duplexing control apparatus for controlling an operation mode of a first of two time division switching devices incorporated within an electronic switching system (ESS), each of said time division switching devices arranged to select and connect two assigned subscribers, said apparatus comprising:

a mode controller
    accepting first and second current feedback duplexing control signals reflective of an operation mode of respective first and second time division switching devices, and
    outputting first and second mode control signals in response thereto;

a first duplexing status analyzer
    accepting said first and second mode control signals, status signals from said first time division switching device, and power information from a power supply included in said second time division switching device, and
    outputting an initial duplexing control signal and a power error signal in response thereto; and a second duplexing status analyzer
    accepting said initial duplexing control signal, said power error signal, said second current feedback duplexing control signal, and a status signal from the second time division switching device, and
    outputting a next first feedback duplexing control signal in response thereto.

5. An apparatus of claim 4, wherein the power status information is derived by comparing a level of the power with a predetermined threshold value TH1, and outputting a first signal indicating an erroneous condition whenever the level is less that TH1, and a second signal indicating a normal condition, whenever the level meets or exceeds TH1.

6. An apparatus according to claim 4, wherein the mode controller includes a NAND gate, an inverter and an EX-OR gate coupled to an input thereof, and a D Flip-flop connected to the output of the NAND gate, wherein the first mode control signal is derived from the output of the NAND gate and the second mode control signal is provided from the output of the D Flip-flop.

* * * * *